United States Patent
Hess et al.

(10) Patent No.: US 6,846,027 B1
(45) Date of Patent: Jan. 25, 2005

(54) PANEL CARRYING DEVICE

(76) Inventors: Matt E. Hess, 205 Cedar P.O. Box 101, Manhattan, MT (US) 59741; Gary L. Hess, 6310 W. Dry Creek Rd., Manhattan, MT (US) 59741; Jerry J. Hess, P.O. Box 472, Three Forks, MT (US) 59752; Billy Joe Hess, P.O. Box 511, Manhattan, MT (US) 59741

( * ) Notice: Subject to any disclaimer, the term of this patent is extended or adjusted under 35 U.S.C. 154(b) by 0 days.

(21) Appl. No.: 10/270,857

(22) Filed: Oct. 15, 2002

Related U.S. Application Data

(63) Continuation-in-part of application No. 09/860,318, filed on May 18, 2001, now abandoned.

(51) Int. Cl.[7] ................................................. B65G 7/12
(52) U.S. Cl. ......................................... 294/15; 294/158
(58) Field of Search .............................. 294/15, 16, 26, 294/92, 137, 158, 159, 170; 16/406, 422–425

(56) References Cited

U.S. PATENT DOCUMENTS

| | | | |
|---|---|---|---|
| 2,510,591 A | 6/1950 | Listman | |
| 2,537,750 A | 1/1951 | Gretschel | |
| 2,579,826 A | 12/1951 | Ingram et al. | |
| 2,620,955 A | 12/1952 | Elder | |
| 2,623,772 A | 12/1952 | Johnson | |
| 3,176,326 A | 4/1965 | Zysman et al. | |
| 3,306,507 A | 2/1967 | Wilson | |
| 3,498,662 A | 3/1970 | Rey | |
| 4,190,278 A | 2/1980 | Jancik, Jr. | |
| 4,411,064 A | 10/1983 | Koppensteiner et al. | |
| 4,463,977 A | 8/1984 | Wyatt | |
| 5,390,972 A | 2/1995 | Galloway | |
| D361,934 S | 9/1995 | Croteau | |

*Primary Examiner*—Dean J. Kramer

(57) ABSTRACT

A panel carrying device for holding a concrete form panel is disclosed. The device comprises an elongate handle with opposite ends. A pair of elongate arms are each mounted on one of the opposite ends of the handle with the handle extending between the arms. Each of the arms has a first end and a second end, with the first end of each of the arms being insertable into a hole in the concrete form panel. An elongate slot is formed in each of the arms for engaging an edge of the wall of the panel about the hole in the panel. The slot is formed in the first end of the arm. A longitudinal axis of the slot of each of the arms is positioned substantially perpendicular to a longitudinal axis of the respective arm for aligning the wall of the panel substantially parallel to the handle when each of the arms is extended through the holes in the wall of the concrete form panel.

10 Claims, 2 Drawing Sheets

PANEL CARRYING DEVICE

CROSS REFERENCE TO RELATED APPLICATION

This application is a continuation-in-part of application Ser. No. 09/860,318, filed May 18, 2001 now abandoned.

BACKGROUND OF THE INVENTION

1. Field of the Invention

The present invention relates to panel carrying devices and more particularly pertains to a new panel carrying device for allowing a user to grip a handle for packing concrete forms used in industrial and commercial wall and pier pours.

2. Description of the Prior Art

Concrete form panels are used to construct temporary forms for forming concrete. Due to the strength and rigidity needed from the forms, the form panels tend to be heavy. The form panels are reusable, and in the process of these repeated uses, the surfaces of the form panel that are not directly in contact with the formed concrete can get caked with various debris including dirt and excess concrete from earlier pours. Because the concrete form panels are reusable, the panels must be repeatedly moved from jobsite to jobsite, which typically involves stacking and unstacking the form panels between uses. Much of the moving of the concrete form panels involves the grabbing, lifting, and carrying of each of the form panels by hand. This process is made more difficult by the fact that the concrete form panels typically do not have any convenient and useful hand hold on the edges of the form panel, so pulling a form panel from the top of a stack of form panels often requires two hands just to get a suitable grip on the panel to slide it from the stack. Further, placing the forms back into a stack can put fingers at risk as the fingers of the mover must be removed from below the frame of the form panel before the fingers become crushed between the form panel being placed on the stack and the form panel already on the top of the stack. The heavy metal frame of the form panel can easily pinch the mover's fingers during the staking process.

Known prior art includes U.S. Pat. No. 3,498,662; U.S. Pat. No. 4,190,278; U.S. Pat. No. 2,623,772; U.S. Pat. No. 2,620,955; U.S. Pat. No. 4,463,977; and U.S. Pat. No. Des. 361,934.

While these devices fulfill their respective, particular objectives and requirements, the aforementioned patents do not disclose a new panel carrying device. The inventive device includes an elongate handle with opposite ends. A pair of elongate arms are each mounted on one of the opposite ends of the handle with the handle extending between the arms. Each of the arms has a first end and a second end, with the first end of each of the arms being insertable into a hole in the concrete form panel. An elongate slot is formed in each of the arms for engaging an edge of the wall of the panel about the hole in the panel. The slot is formed in the first end of the arm. A longitudinal axis of the slot of each of the arms is positioned substantially perpendicular to a longitudinal axis of the respective arm for aligning the wall of the panel substantially parallel to the handle when each of the arms is extended through the holes in the wall of the concrete form panel.

In these respects, the panel carrying device according to the present invention substantially departs from the conventional concepts and designs of the prior art, and in so doing provides an apparatus primarily developed for the purpose of allowing a user to grip a handle for packing concrete forms used in industrial and commercial wall and pier pours.

SUMMARY OF THE INVENTION

In view of the foregoing disadvantages inherent in the known types of panel carrying devices now present in the prior art, the present invention provides a new panel carrying device construction wherein the same can be utilized for allowing a user to grip a handle for packing concrete forms used in industrial and commercial wall and pier pours.

The general purpose of the present invention, which will be described subsequently in greater detail, is to provide a new panel carrying device apparatus and method which has many of the advantages of the panel carrying devices mentioned heretofore and many novel features that result in a new panel carrying device which is not anticipated, rendered obvious, suggested, or even implied by any of the prior art panel carrying devices, either alone or in any combination thereof.

To attain this, the present invention generally comprises an elongate handle with opposite ends. A pair of elongate arms are each mounted on one of the opposite ends of the handle with the handle extending between the arms. Each of the arms has a first end and a second end, with the first end of each of the arms being insertable into a hole in the concrete form panel. An elongate slot is formed in each of the arms for engaging an edge of the wall of the panel about the hole in the panel. The slot is formed in the first end of the arm. A longitudinal axis of the slot of each of the arms is positioned substantially perpendicular to a longitudinal axis of the respective arm for aligning the wall of the panel substantially parallel to the handle when each of the arms is extended through the holes in the wall of the concrete form panel.

Significantly, the present invention utilizes the holes present in most, if not substantially all, concrete form panels that are provided for receiving the "keys" that temporarily tie the forms together during use. The invention engages these holes, and makes it significantly easier and safer to move the form panels, especially as the invention permits the form panels to be pulled from a stack of form panels without having to lift the form panel and insert fingers below the panel prior to movement. The present invention also minimizes the contact required between the user's hands and the form panel so that the user's hands are not abraded or cut by the excess concrete that may be left on surfaces of the form panel.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new panel carrying device apparatus and method which has many of the advantages of the panel carrying devices mentioned heretofore and many novel features that result in a new panel carrying device which is not anticipated, rendered obvious, suggested, or even implied by any of the prior art panel carrying devices, either alone or in any combination thereof.

It is another object of the present invention to provide a new panel carrying device, which may be easily and efficiently manufactured and marketed.

It is a further object of the present invention to provide a new panel carrying device, which is of a durable and reliable construction.

An even further object of the present invention is to provide a new panel carrying device which is susceptible of a low cost of manufacture with regard to both materials and labor, and which accordingly is then susceptible of low prices of sale to the consuming public, thereby making such panel carrying device economically available to the buying public.

Still yet another object of the present invention is to provide a new panel carrying device which provides in the apparatuses and methods of the prior art some of the advantages thereof, while simultaneously overcoming some of the disadvantages normally associated therewith.

Still another object of the present invention is to provide a new panel carrying device for allowing a user to grip a handle for packing concrete forms used in industrial and commercial wall and pier pours.

Yet another object of the present invention is to provide a new panel carrying device which includes an elongate handle with opposite ends. A pair of elongate arms are each mounted on one of the opposite ends of the handle with the handle extending between the arms. Each of the arms has a first end and a second end, with the first end of each of the arms being insertable into a hole in the concrete form panel. An elongate slot is formed in each of the arms for engaging an edge of the wall of the panel about the hole in the panel. The slot is formed in the first end of the arm. A longitudinal axis of the slot of each of the arms is positioned substantially perpendicular to a longitudinal axis of the respective arm for aligning the wall of the panel substantially parallel to the handle when each of the arms is extended through the holes in the wall of the concrete form panel.

Still yet another object of the present invention is to provide a new panel carrying device that would provide a large, easily grasped lifting point for a steel concrete form panel, thereby greatly reducing the amount of strength and physical effort required to carry it.

Even still another object of the present invention is to provide a new panel carrying device that would be small in size and simplicity would make it inexpensive, while its heavy steel construction would make it strong, durable and resistant to wear.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
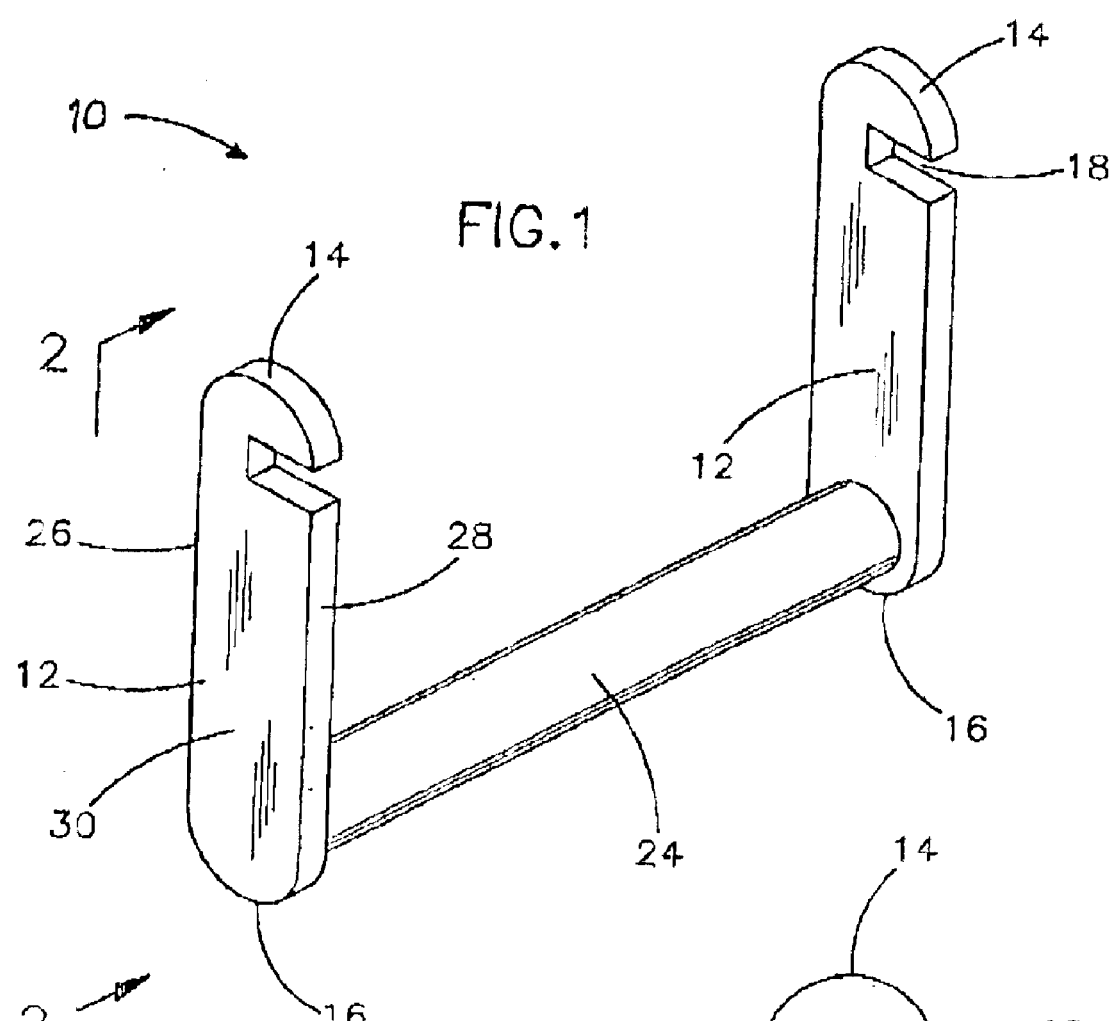
FIG. 1 is a perspective view of a new panel carrying device according to the present invention.
Figure 2:
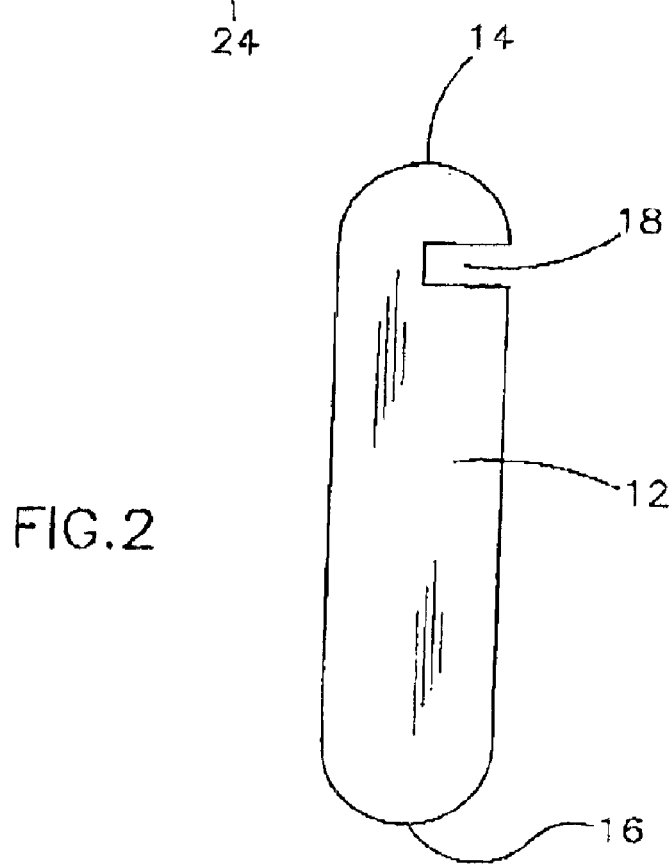
FIG. 2 is an end view of the present invention.
Figure 3:
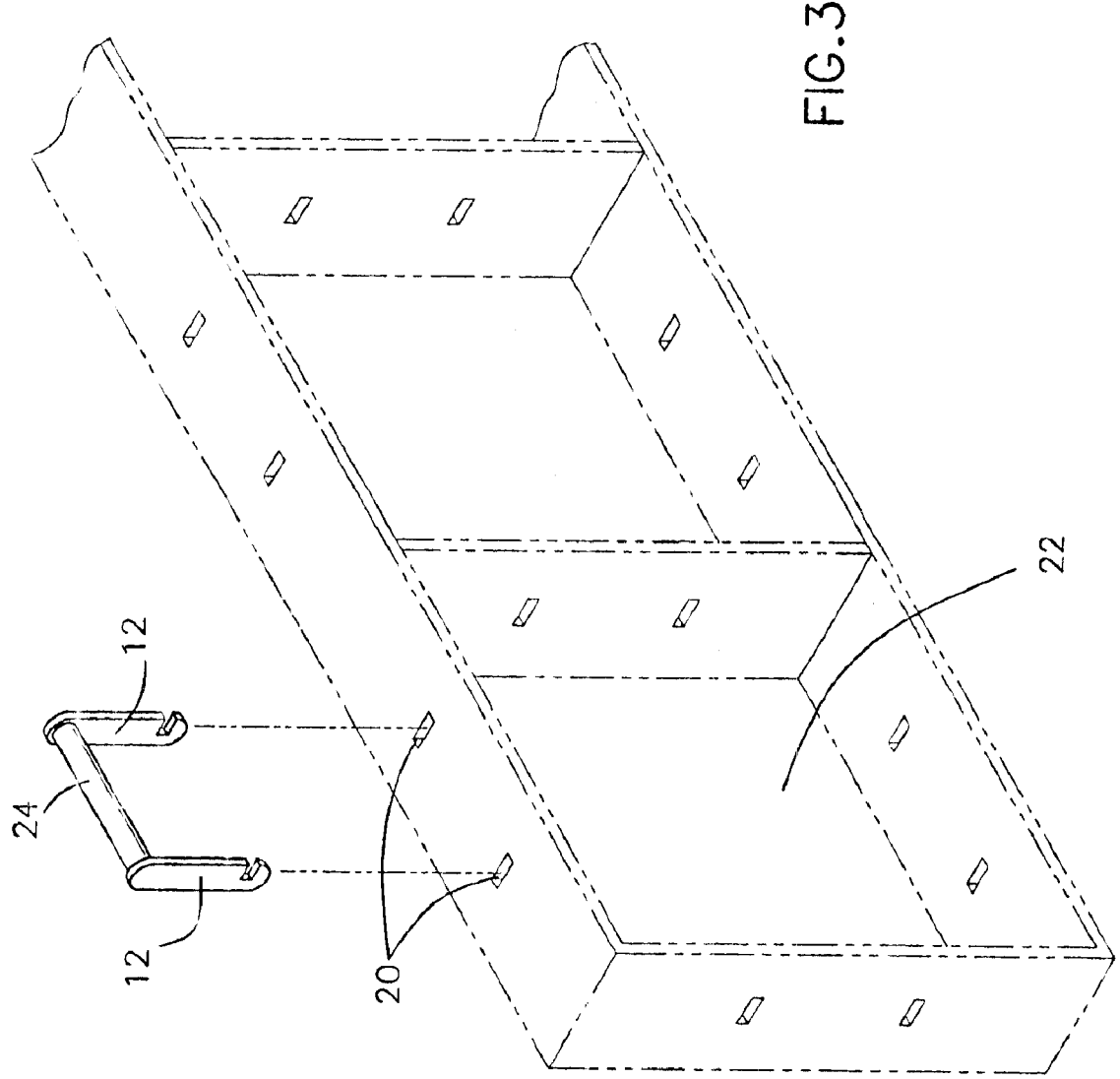
FIG. 3 is a perspective view of a new panel carrying device according to the present invention.

With reference now to the drawings, and in particular to FIGS. 1 through 3 thereof, a new panel carrying device embodying the principles and concepts of the present invention and generally designated by the reference numeral 10 will be described.

As best illustrated in FIGS. 1 through 3, the panel carrying device 10 of the invention generally includes an elongate handle 24 for gripping by a hand of a user. The handle 24 has opposite ends, and may be substantially cylindrical in shape, although other shapes may be used. The panel carrying device 10 also includes a pair of elongate arms 12, with each of the elongate arms being mounted on one of the opposite ends of the handle 24 such that the handle extends between the elongate arms. The elongate arms 12 may be substantially orthogonally oriented with respect to the handle 24. Each of the elongate arms 12 may have a first end 14 and a second end 16. The handle 24 may be mounted on each of the elongate arms 12 at a location adjacent to the second end 16 of the arms 12. The first end 14 of each of the elongate arms 12 is insertable into a hole 20 in the concrete form panel.

Significantly, an elongate slot 18 is formed in each of the elongate arms 12 for engaging an edge of the wall of the concrete form panel about the hole 20 in the panel. The slot 18 may be formed in the first end 14 of the arm 12. A longitudinal axis of the slot 18 of each of the arms 12 is positioned substantially perpendicular to a longitudinal axis of the respective elongate arm, which functions to align the wall of the panel in a substantially parallel orientation to the handle 24 when each of the arms 12 is extended through the holes 20 in the wall of the panel.

In one embodiment of the invention, a longitudinal axis of each of the arms 12 passes through the handle 24 and the slot 18 of the arms for concentrating a weight of the form panel below the handle when the slot of the arm is engaged with the hole of the form panel.

Each of the slots 18 may have side edges and an end edge, and the side edges may be oriented substantially parallel to each other, and the end edge may be oriented substantially perpendicular to the side edges.

Each of the arms 12 may have a planar outer surface 26, a planar inner surface 28, and a peripheral wall surface 30. The peripheral wall surface 30 extends between a perimeter of the outer surface 26 and a perimeter of the inner surface 28. The outer surface 26 and the inner surface 28 may be oriented substantially parallel to each other.

The peripheral wall surface 30 may have side surface portions, and the slot 18 of each of the arms 12 may extend through a first of the side surface portions of the peripheral wall surface toward a second side surface portion of the peripheral wall surface.

Significantly, the first end 14 of each of the arms 12 may be arcuate or rounded or otherwise tapered for guiding insertion of the first end 14 of the respective arm 12 into and through one of the holes 20 of the walls of the concrete form panel.

In use, the notches would be seated on a pair of adjacent holes, this would seat or lock the unit in place, thereby enabling its pipe to serve as an easily grasped handgrip. This could, in turn, greatly reduce the amount of physical strength and effort required to move such a panel.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A panel carrying device for engaging holes formed in walls of a concrete form panel for aiding in the carrying of the panel, the panel carrying device comprising:

an elongate handle for gripping by a hand of a user, the handle having opposite ends;

a pair of elongate arms, each of the elongate arms being mounted on one of the opposite ends of the handle such that the handle extends between the elongate arms, each of the elongate arms having a first end and a second end, the first end of each of the elongate arms being insertable into a hole in the concrete form panel;

wherein an elongate slot is formed in each of the elongate arms for engaging an edge of the wall of the panel about the hole in the panel, the slot being formed in the first end of the arm; and wherein a longitudinal axis of the slot of each of the arms is positioned substantially perpendicular to a longitudinal axis of the respective elongate arm for aligning the wall of the panel substantially parallel to the handle when each of the arms is extended through the holes in the wall of the concrete form panel;

wherein a peripheral wall surface of the first end of each of the arms is arcuate for guiding insertion of the first end of the respective arm into and through one of the holes of the walls of the concrete form panel.

2. The panel carrying device of claim 1 wherein each of the slots has side edges and an end edge, the side edges being oriented substantially parallel to each other.

3. The panel carrying device of claim 2 wherein the end edge being oriented substantially perpendicular to the side edges.

4. The panel carrying device of claim 1 wherein each of the arms has a peripheral wall surface, the peripheral wall surface having side surface portions, the slot of each of the arms extends through a first of the side surface portions of the peripheral wall surface toward a second side surface portion of the peripheral wall surface.

5. The panel carrying device of claim 1 wherein the handle is substantially cylindrical.

6. The panel carrying device of claim 1 wherein the elongate arms are substantially orthogonally oriented with respect to the handle.

7. A panel carrying device for engaging holes formed in walls of a concrete form panel for aiding in the carrying of the panel, the panel carrying device comprising:

an elongate handle for gripping by a hand of a user, the handle having opposite ends, the handle being substantially cylindrical;

a pair of elongate arms, each of the elongate arms being mounted on one of the opposite ends of the handle such that the handle extends between the elongate arms, the elongate arms being substantially orthogonally oriented with respect to the handle, each of the elongate arms having a first end and a second end, the handle being mounted on each of the elongate arms adjacent to the second end thereof, the first end of each of the elongate arms being insertable into a hole in the concrete form;

wherein an elongate slot is formed in each of the elongate arms for engaging an edge of the wall of the panel about the hole in the panel, the slot being formed in the first end of the arm;

wherein a longitudinal axis of the slot of each of the arms is positioned substantially perpendicular to a longitudinal axis of the respective elongate arm for aligning the wall of the panel parallel to the handle when each of the arms is extended through the holes in the wall of the concrete form panel;

wherein each of the slots has side edges and an end edge, the side edges being oriented substantially parallel to each other, the end edge being oriented substantially perpendicular to the side edges;

wherein each of the arms has a planar outer surface, a planar inner surface and a peripheral wall surface, the peripheral wall surface extending between a perimeter of the outer surface and a perimeter of the inner surface, the outer surface and the inner surface being substantially parallel;

wherein the peripheral wall surface has side surface portions, the slot of each of the arms extend through a first of the side surface portions of the peripheral wall surface toward a second side surface portion of the peripheral wall surface;

wherein the first end of each of the arms is arcuate for guiding insertion of the first end of the respective arm into and through one of the holes of the walls of the concrete form panel.

8. A method of lifting a concrete form panel by engaging holes formed in walls of the form panel, the method comprising:

providing a panel carrying device comprising:

an elongate handle having opposite ends; and a pair of elongate arms, each of the elongate arms being mounted on one of the opposite ends of the handle such that the handle extends between the elongate arms, the elongate arms being substantially orthogonally oriented with respect to the handle, each of the elongate arms having a first end and a second end;

wherein a slot is formed in each of the elongate arms for engaging an edge of the wall of the panel about the hole in the panel, the slot being formed in the first end of the arm;

inserting the first end of each of the elongate arms into one of the holes of one of the walls of the form panel such that the elongate arms are inserted into a spaced pair of holes in the walls; and shifting the elongate arms in a direction perpendicular to a longitudinal axis of the elongate arms for moving a portion of the wall of the form panel into each of the slots of the arms.

9. The method of claim 8 wherein a longitudinal axis of the slot of each of the arms is positioned substantially perpendicular to a longitudinal axis of the respective elongate arm, and including the step of aligning the wall of the panel parallel to the handle when each of the arms is extended through the holes in the wall of the panel.

10. The method of claim 8 wherein the first end of each of the arm is arcuate for guiding insertion of the first end of the respective arm into and through one of the holes of the walls of the panel.

* * * * *